May 12, 1953 S. B. COLEMAN 2,638,501

ELECTRONIC NOISE SUPPRESSOR

Filed Nov. 4, 1948 3 Sheets-Sheet 1

INVENTOR.
S. B. COLEMAN
BY

May 12, 1953 S. B. COLEMAN 2,638,501

ELECTRONIC NOISE SUPPRESSOR

Filed Nov. 4, 1948 3 Sheets-Sheet 2

INVENTOR.
S. B. COLEMAN
BY Bm. J. Chromy
his Atty

INVENTOR.
S.B. COLEMAN
BY Bm. J. Cheney
his atty

Patented May 12, 1953 2,638,501

UNITED STATES PATENT OFFICE 2,638,501

ELECTRONIC NOISE SUPPRESSOR

Sidney B. Coleman, Basking Ridge, N. J.

Application November 4, 1948, Serial No. 58,187

6 Claims. (Cl. 178—44)

Figure 1:
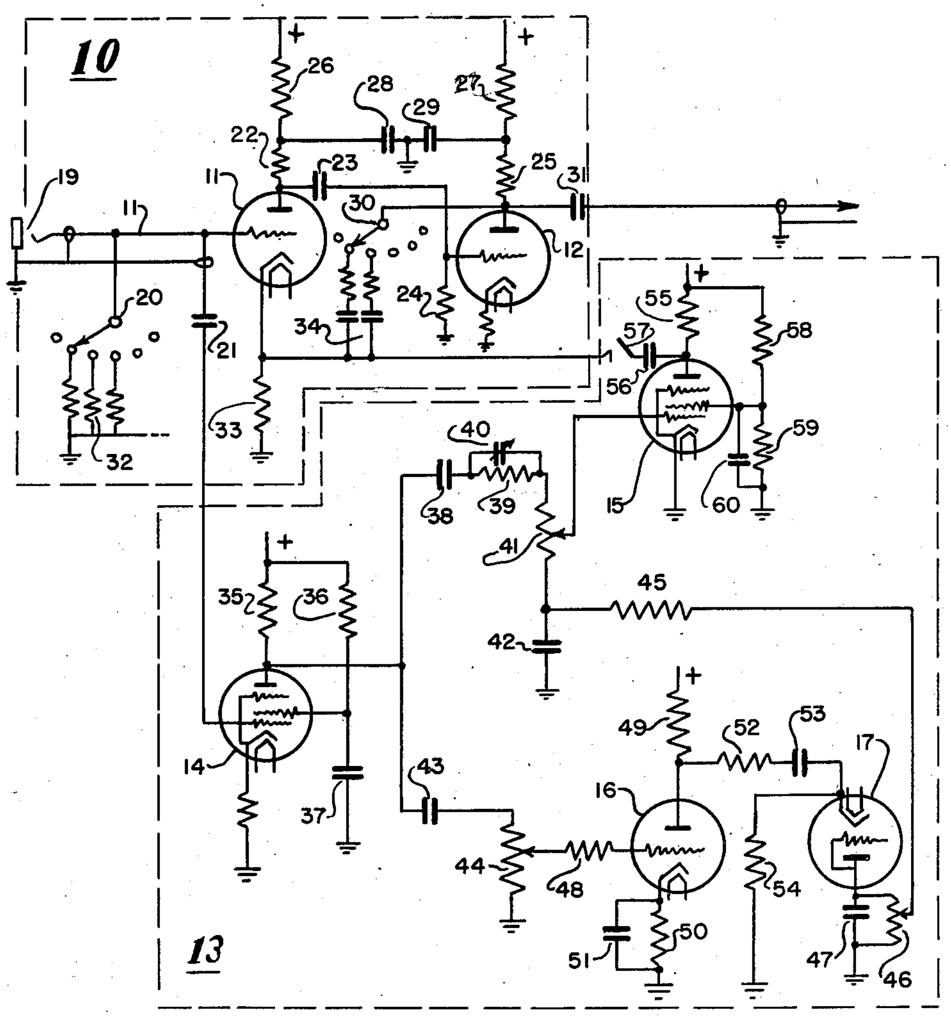

This invention relates to sound reproducing systems in general. More particularly this invention relates toan improved system for automatically neutralizing objectionable interference in sound reproducing systems.

An object of this invention is to provide a sound reproducing system in which objectionable noise or interference voltages are automatically neutralized.

Another object of this invention is to provide a sound reproducing system for reproducing recordings in a manner such that objectionable interference such as needle scratch may be automatically reduced or substantially eliminated.

Still another object of this invention is to provide apparatus for playing or reproducing phonograph records, such apparatus being equipped with a simple and relatively inexpensive electronic control for substantially eliminating the reproduction of objectionable needle scratch.

A further object of this invention is to provide a control circuit adapted to be connected to a sound reproducing amplifier for the purpose of reducing or substantially eliminating the reproduction of objectionable interference.

Still another object of this invention is to provide a sound reproducing amplifier in which an arrangement is employed such that at low or no signal input to the amplifier the noise voltages on the grid of one of the amplifier stages are opposed by corresponding noise voltages impressed on the cathode of the same stage of the amplifier.

Other and further objects of this invention will be apparent to those skilled in the art to which it relates from the following specification, claims and drawing, in which the sole figure illustrates a schematic wiring diagram of an embodiment of this invention.

In accordance with this invention there is provided an electronic arrangement which may be connected to operate in conjunction with any amplifier associated with a record reproducing system or with any other sound reproducing system for the purpose of eliminating objectionable noise or interference from the amplifier of sound reproducing system.

Since the principal noise is characterized as transient having a selectively high rate of change of voltage with time it may be treated analytically as high frequency time wave voltages as distinguished from the corresponding voltage changes or time wave components of medium or low frequency comprising the fundamental tones of speech and music. Thus the predominating noise components in phonograph record reproduction correspond in frequency range to the higher fundamental frequencies of the order of 3,000 cycles per second and up and overtones of the speech and music fundamentals. When these fundamental sound frequencies below about 3,000 cycles are of low amplitude, as when instruments are played softly, their overtones in this high frequency range above 3,000 cycles are correspondingly reduced in amplitude and generally will be of the same order of magnitude or less than the background noise and will not be audible above the noise. It is of course understood that 3,000 cycles is used only as a comparison or reference point since there is no sharp demarcation between such fundamental frequencies and overtones. The loss of these higher frequency components of the "signal" when this frequency band under such conditions is eliminated will not seriously impair reproduction as heard by the listener, but the distracting noise will be gone and the overall effect greatly improves the enjoyability of the reproduction. As the fundamentals increase in amplitude during louder passages so the overtones increase also. The louder signal fundamentals are then normally amplified and passed onto the output since the neutralizing action of the circuit is rendered ineffective.

Figure 2:
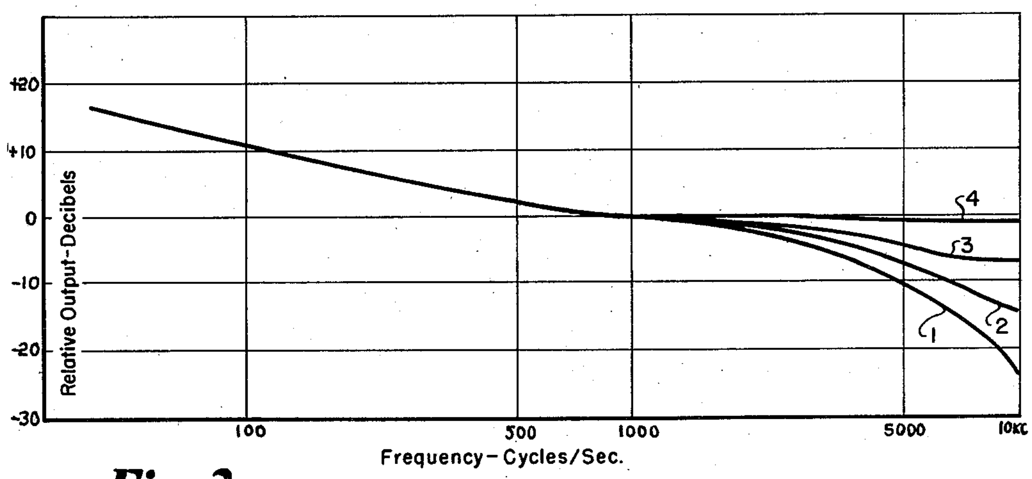
Figure 3:
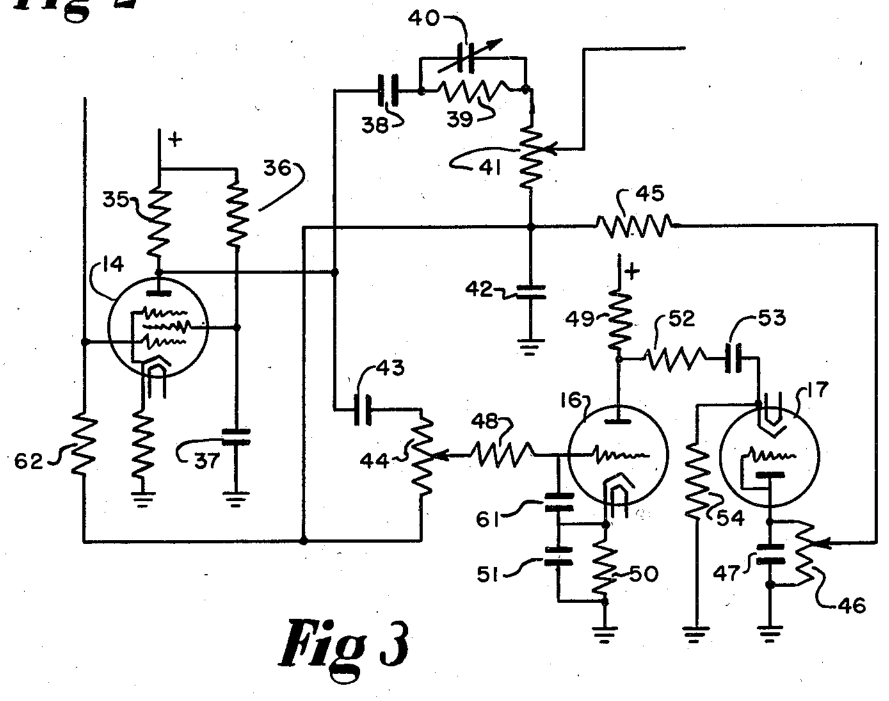
Figure 4:
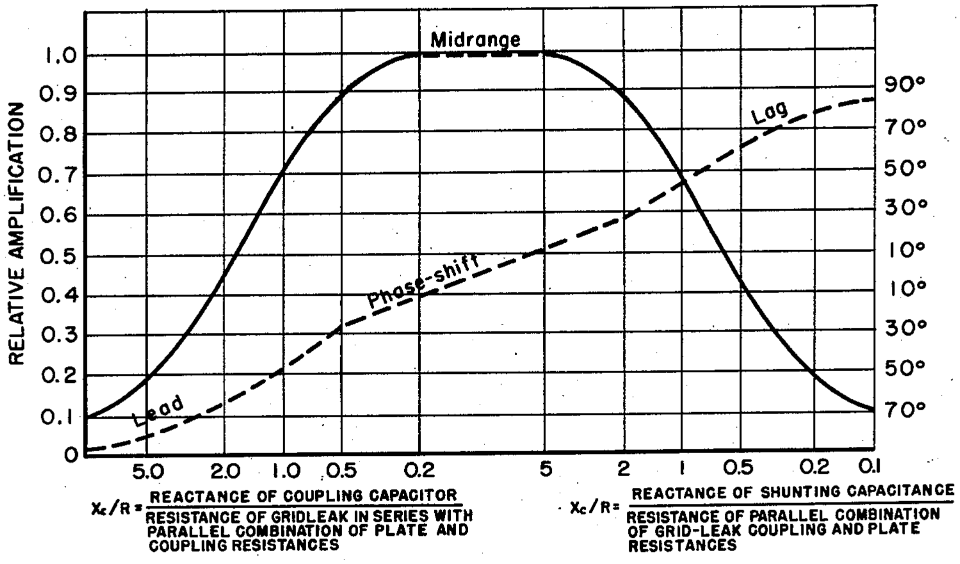
Figure 5:
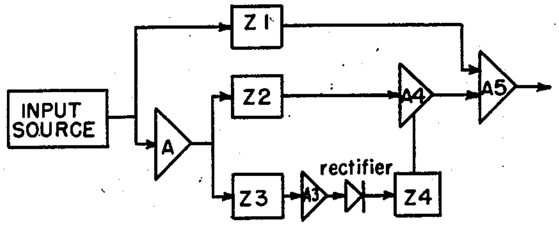
Figure 6:
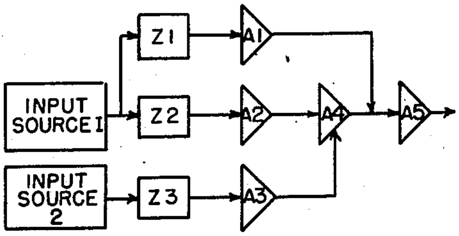
Figure 7:
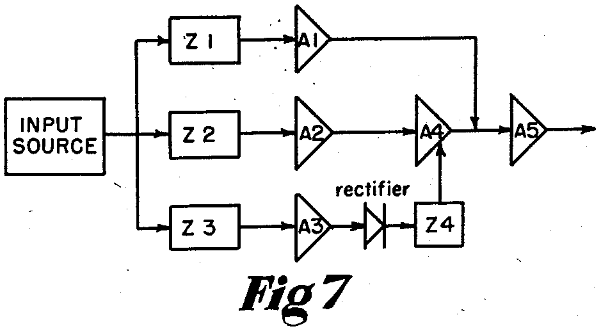

Further details of this invention are set forth in the following specification, claims and drawing in which briefly Figure 1 is a schematic wiring diagram of an embodiment of this invention; Figure 2 is a graph of the reproduction verses frequency characteristic of an embodiment of this apparatus; Figure 3 is a schematic wiring diagram of a modified form of this invention; Figure 4 is a graph showing typical amplification characteristics of a resistance coupled amplifier and Figures 5, 6 and 7 are block diagrams showing how this invention may be coupled to various conventional amplifiers.

Referring to the drawing in detail there is illustrated a preamplifier 10 employing a pair of electron discharge devices 11 and 12 connected for the purpose of amplifying the output from a device such as a microphone, a phonograph pick-up or a light sensitive cell. Associated with this amplifier 10 is an electronic device 13 including electron discharge devices 14, 15, 16 and 17 that are connected together and to the amplifier 10 for the purpose of neutralizing objectionable noise voltages introduced into the amplifier so that these objectionable noise voltages are not amplified by the amplifier.

The amplifier 10 illustrated in a two-stage preamplifier with equalization for various types of pick-ups or input devices. It is of course obvious that this invention may be employed with other amplifiers that are not provided with this equalization. In fact the invention is not limited in its use to preamplifiers but may be associated with intermediate stages of an amplifier or with the output stage of a amplifier although its use in conjunction with the preamplifier is perferred when the invention is limited to reduction of objectionable noise such as background noise found in recordings. However, the invention may be employed for the reduction of objectionable noise arising in the tubes of a multi-stage amplifier and in that case of course the noise reduction apparatus is associated with the output stage of the amplifier in the same manner as it is connected to the preamplifier illustrated in the drawing.

The control grid of the tube 11 is connected by the conductor 18 to the input jack 19, the switch 20 and to one side of the capacitor 21, the other side of the capacitor 21 being connected to the control grid of the pentode amplifier 14. The anode of the tube 11 is connected to one terminal of the resistor 22 and to one terminal of the capacitor 23, the other terminal of this capacitor being connected to the control grid of the tube 12 which is also connected to ground through the grid resistor 24. An anode resistor 25 similar to the resistor 22, is connected to the anode of the tube 12. Positive voltage from the B battery or other suitable anode current supply such as a rectified and filtered A. C. supply, is connected to the anode resistors 22 and 25 through resistors 26 and 27 respectively. The junction between the resistors 22—26 is connected to one terminal of the capacitor 28 and the junction between the resistors 25—27 is connected to one terminal of the capacitor 29. The other terminals of the capacitors 28 and 29 are connected together and grounded. These capacitors are each of relatively large capacity and function as filter and bypass capacitors for alternating current of both high and low frequencies.

The anode of the tube 12 is also connected to the switch 30 and to one side of the coupling capacitor 31, the other side of this capacitor 31 being connected to the input of another amplifier or to a reproducing device such as a loudspeaker, or to a suitable recording device which are not shown.

Equalization, that is, feedback and bass compensation for various types of pickups or input devices is obtained in the preamplifier 10 by means of the switches 20 and 30 having suitable impedance elements associated therewith. For example the switch 20 is provided with a plurality of terminals to which are connected the resistors 32 of different values. One terminal of each of these resistors is grounded so that by means of the switch 20 resistors of different values may be connected across the input of the tube 11 inasmuch as the cathode of this tube 11 is connected to ground through the cathode resistor 33. The switch 30 is also provided with a plurality of contacts which may be selectively connected into circuit by means of the contactor thereof. A plurality of series circuits 34 each consisting of a resistor and a capacitor are connected between the contacts of the switch 30 and the cathode of the tube 11 so that different ones of this plurality of series circuits may be connected between the anode of the tube 12 and the cathode of the tube 11 to provide the desired feedback between the anode of the tube 12 and the cathode of the tube

11, the magnitude and phase of the voltage feedback between this anode and cathode being determined by the values of the resistor and capacitor selected by the switch 30.

The control grid of the pentode 14 is coupled to the input conductor 18 through the capacitor 21 as previously described. The circuit of the pentode 14 however is adjusted so that the output thereof consists principally of the high audio frequencies.

The anode of the tube 14 is connected to one terminal of the anode resistor 35, the other terminal of this resistor being connected to the positive B voltage supply which may consist of a battery or rectified supply the same as provided for the tubes 11 and 12 and the same supply may be used for the anodes of the tubes 15 and 16. The negative terminal of this supply is of course grounded to the metal frame supporting this apparatus so that the desired connection is provided between the negative terminal of the current supply and the cathodes of the tubes 11, 12, 14, 15 and 16.

The screen grid of the tube 14 is connected to the positive terminal of the B supply through the resistor 36. This screen grid is also coupled to ground through the capacitor 37 which functions as a bypass capacitor.

The anode of the tube 14 is connected to a pair of output circuits. One of these circuits consists of a capacitor 38 connected in series with a resistor 38 that is shunted by a variable capacitor 40. The potentiometer 41 is connected in series with the resistor 39 and capacitor 40 and the capacitor 42 is connected between the potentiometer 41 and ground. The junction between the potentiometer 41 and the capacitor 42 is connected to one terminal of the resistor 45, the other terminal of this resistor 45 being connected to the variable contactor of the potentiometer 46 that is connected between the anode of rectifier 17 and ground. The potentiometer 46 is shunted by a small filter capacitor 47.

The other output circuit connected to the anode of the tube 14 includes the capacitor 43 and the potentiometer 44, the variable contactor of the potentiometer 44 being connected to the grid of the tube 16 through the resistor 48.

The variable contactor of the potentiometer 41 is connected to the control grid of the pentode 15. The anode of the pentode 15 is connected to the positive terminal is the B supply voltage through the anode resistor 55 and the screen grid of the tube 15 is also connected to this B voltage supply. However a voltage divider comprising the resistors 58 and 59 connected in series across the B voltage supply is provided for this purpose and the screen grid is connected to the junction between these resistors 58 and 59. A bypass capacitor 60 is connected across the resistor 59 to ground.

The output of the gain controlled pentode amplifier 15 is coupled through the capacitor 56 and the switch 57 to the cathode of the amplifier tube 11. It will be observed that the point at which the control grid of the tube 14 is connected to the amplifier 11 is substantially 180° out of phase with the point at which the output of the amplifier tube 15 is connected to the amplifier 11. This relation must be maintained as will be explained in further detail hereinafter, although the exact points at which the control grid of the tube 14 and the output of the tube 15 are connected to the amplifiers 11 and 12 may be changed so long as the signal voltages at the two points to which the connections are made are out of phase by substantially 180°.

As previously mentioned the control grid of the tube 16 is connected to the potentiometer 44. The anode of this tube is connected to the positive terminal of the B voltage supply through the resistor 49 and the cathode is connected to ground through the cathode resistor 50 that is shunted by a bypass capacitor 51. The output of the amplifier tube 16 is rectified by the rectifier tube 17 and for this purpose the cathode of this tube is coupled to the anode of the tube 16 through the capacitor 53 and the resistor 52. The anode of the rectifier 17 is connected to one end of the potentiometer 46 and to one side of the capacitor 47, the other terminal of this resistor and capacitor being grounded and the variable contactor of the resistor 46 being connected to the junction of the potentiometer 41 and capacitor 42 through the resistor 45. Thus the rectified voltage output of the rectifier 17 is supplied to the grid circuit of the pentode 15.

All of the tubes 11, 12, 14, 15, 16 and 17 are provided with indirectly heated cathodes and the heaters for these cathodes may be energized by alternating current supplied from a suitable transformer. The cathodes are well insulated from these heaters in a manner well known in the art.

As previously described the circuit of the amplifier tube 14 is adjusted so that the output of this tube consists principally of high audio frequencies, for example audio frequencies above 3,000 to 5,000 cycles. During intervals when the output of the tube 14 is low this output is made up principally of objectionable noise such as the scratch noises obtained from the reproduction of phonograph records. This low amplitude output of the tube 14 is supplied to the control grid of the tube 15 from the potentiometer 41. The variable contactor of this potentiometer 41 may be adjusted to supply the control grid of the tube 15 with the proper amplitude noise signal so that the output of this tube 15 that is supplied to the cathode circuit of the tube 11 180° out of phase with the corresponding signal applied to the grid of this tube 11, is of just the right amplitude to neutralize this latter signal with the result that the noise output of this amplifier 10 is reduced practically to zero. As the signal level is increased at the input, however, high frequency, for example 3,000 to 10,000 cycle components of the signal are amplified by the tubes 14 and 16 and rectified by the tube 17. The rectified output of the tube 17 is applied as a negative D. C. voltage bias to the control grid of the gain controlled amplifier 15 thereby reducing the gain of this amplifier and eliminating the neutralizing signal that the output of this amplifier would otherwise impress on the cathode of the tube 11, thus restoring normal high frequency amplification in the tube 11 during louder signal intervals.

The shape of the respective low or weak signal and high or strong signal amplification versus frequency characteristics of the preamplifier 10 are thus controlled by the gain versus frequency characteristics of the tubes 14 and 15 and the amplitude of the signal components that are effective in the rectifier circuit.

This amplification or reproduction versus frequency characteristic is illustrated in Figure 2 in which four curves 1, 2, 3 and 4 are shown. The low frequency portion of these curves are shown as coinciding because this apparatus is adjusted to function principally at the higher audio frequencies. Curve 1 illustrates the characteristics of the apparatus when very small input levels at frequencies principally in the range from 1,000 to 10,000 cycles are employed. Curves 2 and 3 illustrates the characteristics when large input levels at these frequencies are employed and curve 4 illustrates the characteristics when high input levels at these frequencies are supplied. It will be observed that at the low frequencies the coincident parts of these curves slope upward because the amplifier 10 is provided with low frequency compensation for recording loss. However, this apparatus may be employed with other amplifiers that are not provided with low frequency compensation if desired. Normally the potentiometer 41 that controls the input to the tube 15 is adjusted, when the potentiometer 44 is set for zero input to the tube 16, so that the output of the preamplifier 10 is a minimum assuming a relatively small high frequency input signal such as scratch or record surface noise as the input to the tube 11. The potentiometer 44 is then used as a suppression control whereby the input signal or volume level at which high frequency suppression is removed by the operation of the amplifier 16 and rectifier 17 may be selected as desired. The range of frequencies over which suppression of noise output is reduced may also be controlled by controlling the output characteristics of the amplifier 14.

The arrangement shown in Figure 3 is similar to that shown in Figure 1 and like reference numerals in these two figures refer to corresponding parts. Accordingly the control grid of the tube 14 shown in Figure 3 is also supplied with signals through a capacitor corresponding to the capacitor 21 Figure 1 and the variable contactor of the potentiometer 41 shown in Figure 3 is also adapted to be connected to the control grid of a pentode such as the pentode 15 of Figure 1.

In the circuit shown in Figure 3 the control grid of the tube 14 is also connected to one end of the resistor 62 and the other end of this resistor 62 is connected to the junction between the potentiometer 41, the resistor 45 and the capacitor 42. The lower terminal of the potentiometer 44 instead of being grounded as shown in Figure 1 is also connected to this junction. The purpose of this connection is to prevent high negative charges being stored in the capacitors 42 and 47 beyond requirements of the control grid bias of the tube 15 for full pass band operation. If high negative charges beyond requirements of this bias are permitted to be stored in capacitors 42 and 47 then too great a delay in recovery of signal control in the grid circuit of the tube 15 is encountered after loud signal intervals. The time constants of the resistor 52 and capacitor 53, the resistor 46 and capacitor 47 and the resistor 45 and capacitor 42 are such that the "attack" time, that is a change in grid bias on the tube 15, is fast enough to avoid loss of important high frequencies in sound or signal bursts or transient passages because grid bias voltage is developed quickly to cut the output of the tube 15 and allow full band pass in the amplifier 10 without apparent loss of high frequencies in percusion instruments, speech etc. However, the release time during which this bias on the tube 15 decreases to normal and the tube 15 again becomes effective in blocking high frequency noise, is long enough to avoid stifling of reverberation effects without allowing unmasked noise to persist for an interval long enough to be perceived by the listener.

A small capacitor 61 is connected between the grid and the cathode of the tube 16 to prevent scratch frequencies above 5,000 cycles, for example, from producing bias voltage on this tube when this noise signal level is so high that it would function to cut out the tube 15 and admit itself into the amplifier 10.

The capacitors 38 and 40 and the resistors 39 and 41 and the capacitor 42 which is large in comparison with the capacitors 28 and 40, produce an amplitude and phase characteristic with respect to signals impressed on the control grid of the tube 15 of the form illustrated in Figure 4 which was reproduced from Radio Engineers Handbook by F. E. Terman. The extent to which high frequency transmission through the amplifier 10 is prevented by the action of tubes 14 and 15 depends upon the amplitude and phase of the voltages developed in the output of the tube 15. This in turn depends upon the coupling circuit between the tubes 14 and 15 wherein the reactance of the capacitors 38 and 40 is higher for lower frequencies so that only higher frequency effects appear across the potentiometer 41 and on the grid of the tube 15. This circuit is proportioned so that at a particular high frequency the phase lead introduced by the resistor 55, capacitor 56, the resistor 33 and the tube 15 equals the phase lag introduced by the stray circuit capacitances. The tap on the potentiometer 41 is adjusted so that the amplitude of this frequency component will be equal and opposite in effect at the cathode of the tube 11 to the effect of the same signal or noise component on the grid of the tube 11 with the result that this particular frequency signal component will be exactly neutralized. At frequencies lower than this particular frequency the amplitude and phases will depart from this precise neutralizing condition and there will be a net resultant signal in the tube 11. The apparatus may, however, be adjusted so that the band of frequencies over which high frequency noise suppression or control is effective extends generally upward from about 3,000 cycles to the limit of audibility when the input signal strength is low. With increasing input levels the circuit furnishing the negative bias for the grid of the tube 15 becomes activated and the effect of the suppression channel including the tubes 14 and 15 becomes progressively less and at an input level sufficient to mask the background noise, it becomes negligible and no longer suppresses the high frequencies, thus allowing full reproduction of all fundamental tones and all overtones.

This invention is susceptible of various variations that are illustrated schematically in Figures 5, 6 and 7 wherein the devices Z1, Z2, Z3 are made up of circuit elements capable of affecting the magnitude and phase of impulses eminating from the input source and transmitted to the output in the direction as shown by the arrows. Thus the element Z1 may correspond to the amplifier 10 and the element A may be the amplifier 14, the element Z2 may be the coupling network between the amplifier 14 and the amplifier 15 which corresponds to the element A4. The coupling network between the amplifier 14 and the amplifier 16 may be designated by the element Z3, the amplifier 16 being designated by the element A3. The rectifier corresponds to the rectifier 17 and the network Z4 corresponds to the networks connected to the input and output of this rectifier which control the bias on the amplifier A4. In this case the amplifier A4 controls the amplifier A5 which is also supplied from the network Z1. The form of this invention shown in Figure 6 shows the application thereof to a modulator in which a second source designated as input source 2 is supplied through the network Z3 to an amplifier A3 that controls an amplifier A4. The input source 1 feeds the amplifier A1 and A2 through networks Z1 and Z2. The output of the amplifier A2 is fed to the input of the amplifier A4 and the output of the amplifier A1 is fed to the input of the amplifier A5 along with the output of the amplifier A4. In Figure 7 the circuit elements Z1 A1, Z2 A2 and Z3 A3 are shown as one way transmitting devices and these are made up of circuit elements capable of affecting the magnitude and phase of impulses eminating from the input source and transmitted to the point P in the system. The element A4 is one through which transmission by way of the elements Z2 A2 may be controlled either manually or automatically in relation to the envelope of the signal at the source and the element A4 delivers at the point P certain components of the input in opposite phase but more or less equal in magnitude to the corresponding components arising at that point by way of the path Z1 A1. The rectifier and the filter Z4 develop a control voltage related to the envelope amplitude of the input signal to control the element A4.

It is of course obvious that modifications may be made in this invention and it is therefore not desired to limit this invention to the exact details described except in so far as these details are set forth in the appended claims.

I claim:

1. Apparatus for reducing objectionable background noise in sound amplifiers comprising a sound amplifier, an auxiliary amplifier, connections for connecting the input of said auxiliary amplifier to the input of said sound amplifier, connections for connecting the output of said auxiliary amplifier to a point of said sound amplifier that is substantially 180° out of phase with the aforesaid input, high frequency pass means connected to said auxiliary amplifier, means in said auxiliary amplifier for controlling the characteristics thereof so that at low or no signal input the output of said auxiliary amplifier substantially neutralizes the noise voltages in said sound amplifier, and means in said auxiliary amplifier for reducing the gain of said auxiliary amplifier when signals having frequencies above the middle range of the audio frequency spectrum are impressed upon the input of said sound amplifier.

2. Apparatus for reducing objectionable background noise in sound amplifiers comprising a sound amplifier, an auxiliary amplifier, connections for connecting the input of said auxiliary amplifier to the input of said sound amplifier, connections for connecting the output of said auxiliary amplifier to a point of said sound amplifier that is substantially 180° out of phase with the aforesaid input, high frequency pass means connected to said auxiliary amplifier, means in said auxiliary amplifier for controlling the characteristics thereof so that at low or no signal input said auxiliary amplifier substantially neutralizes the noise voltages in said sound amplifier, said auxiliary amplifier further comprising a rectifier, and means connected to said rectifier to reduce the gain of said auxiliary amplifier when signals above the middle range of the audio frequency spectrum and of substantial amplitude are impressed upon the input of said sound amplifier.

3. Apparatus for reducing objectionable background noise in sound amplifiers comprising a sound amplifier, an auxiliary amplifier, connections for connecting the input of said auxiliary amplifier to the input of said sound amplifier, connections for connecting the output of said auxiliary amplifier to a point of said sound amplifier that is substantially 180° out of phase with the aforesaid input, high frequency pass means connected to said auxiliary amplifier, means in said auxiliary amplifier for controlling the gain versus frequency characteristics thereof so that at low or no signal input said auxiliary amplifier substantially neutralizes the noise voltages in said sound amplifier, and means in said auxiliary amplifier further for reducing the gain thereof when signals above the middle range of the audio frequency spectrum and above a predetermined amplitude are impressed upon the input of said sound amplifier.

4. Apparatus for reducing objectionable background noise in sound amplifier comprising a sound amplifier, an auxiliary amplifier, connections for connecting the input of said auxiliary amplifier to the input of said sound amplifier, connections for connecting the output of said auxiliary amplifier to a point of said sound amplifier that is substantially 180° out of phase with the aforesaid input, high frequency pass means connected to said auxiliary amplifier, means in said auxiliary amplifier for controlling the gain versus frequency characteristics thereof so that at low or no signal input said auxiliary amplifier substantially neutralizes the noise voltages in said sound amplifier, said auxiliary amplifier further comprising a rectifier, and means connected to said rectifier for producing a grid bias for said auxiliary amplifier for reducing the gain thereof when signals above the middle range of the audio frequency spectrum and above a predetermined amplitude are impressed upon the input of said sound amplifier.

5. Apparatus for reducing objectionable background noise in sound amplifiers comprising a sound amplifier, including at least one amplifier stage having a control grid and a cathode, an auxiliary vacuum tube having the output thereof connected to the cathode circuit of said sound amplifier stage, means for controlling said auxiliary vacuum tube connected between the control grid of said auxiliary vacuum tube and the input of said sound amplifier stage, said last mentioned means including a circuit having principally high frequency output for supplying noise voltages to said auxiliary vacuum tube so that said noise voltages may be inserted into the cathode circuit of said sound amplifier stage in opposition to corresponding noise voltages at the grid of said sound amplifier stage so that the noise output of said sound amplifier is reduced practically to zero during low or no signal input, said last mentioned means also including a negative bias control circuit for said auxiliary vacuum tube for reducing the gain thereof during louder signal intervals.

6. Apparatus for reducing objectionable background noise in sound amplifiers comprising a sound amplifier, including at least one amplifier stage having a control grid and a cathode, an auxiliary gain controlled vacuum tube stage having the output thereof connected to the cathode circuit of said sound amplifier stage, means for controlling said auxiliary stage connected between the control grid of said auxiliary stage and the input of said sound amplifier stage, said last mentioned means including a vacuum tube circuit having principally high frequency output for supplying noise voltages to said auxiliary stage so that said noise voltages may be inserted into the cathode circuit of said sound amplifier stage in opposition to corresponding noise voltages at the grid of said sound amplifier stage so that the noise output of said sound amplifier is reduced practically to zero during low or no signal input, said last mentioned means also including an amplifier stage and a rectifier connected to provide negative control bias for said auxiliary gain controlled vacuum tube stage from high frequency components of the signal input for reducing the gain thereof during louder signal intervals.

SIDNEY B. COLEMAN.

References Cited in the file of this patent

UNITED STATES PATENTS

| Number | Name | Date |
|---|---|---|
| 2,162,875 | Bartels et al. | June 20, 1939 |
| 2,189,306 | Anderson | Feb. 6, 1940 |
| 2,208,665 | Crabtree | July 23, 1940 |
| 2,247,085 | Goldman | June 24, 1941 |
| 2,262,846 | Herold | Nov. 18, 1941 |
| 2,307,308 | Sorensen | Jan. 5, 1943 |
| 2,323,634 | Van Slooten | July 6, 1943 |
| 2,361,602 | Clark | Oct. 31, 1944 |
| 2,438,217 | Johnson | Mar. 23, 1948 |